US010913190B2

(12) United States Patent
Ahn et al.

(10) Patent No.: US 10,913,190 B2
(45) Date of Patent: Feb. 9, 2021

(54) METHOD FOR FABRICATING ANTIBACTERIAL CONTAINER

(71) Applicant: PENIEL WORLD CO., LTD, Goyang-si (KR)

(72) Inventors: Jarsam Ahn, Incheon (KR); Geumsooch Bae, Goyang-si (KR)

(73) Assignee: PENIEL WORLD CO., LTD, Goyang-si (KR)

( * ) Notice: Subject to any disclaimer, the term of this patent is extended or adjusted under 35 U.S.C. 154(b) by 133 days.

(21) Appl. No.: 16/070,781

(22) PCT Filed: Sep. 2, 2016

(86) PCT No.: PCT/KR2016/009831
§ 371 (c)(1),
(2) Date: Jul. 18, 2018

(87) PCT Pub. No.: WO2017/126764
PCT Pub. Date: Jul. 27, 2017

(65) Prior Publication Data
US 2019/0016026 A1 Jan. 17, 2019

(30) Foreign Application Priority Data
Jan. 21, 2016 (KR) .................... 10-2016-0007763

(51) Int. Cl.
*B29C 45/00* (2006.01)
*B29B 7/00* (2006.01)
(Continued)

(52) U.S. Cl.
CPC ............ *B29C 45/0001* (2013.01); *B29B 7/00* (2013.01); *B29B 7/005* (2013.01); *B29C 45/00* (2013.01);
(Continued)

(58) Field of Classification Search
CPC .............................. B29C 45/0001; B29B 7/00
See application file for complete search history.

(56) References Cited

U.S. PATENT DOCUMENTS

| | | | |
|---|---|---|---|
| 2006/0225869 A1* | 10/2006 | Hara ..................... | B60H 3/0085 165/134.1 |
| 2007/0218019 A1* | 9/2007 | Andre .................... | C09C 1/043 424/59 |

(Continued)

FOREIGN PATENT DOCUMENTS

| CN | 104118642 A | 10/2014 |
|---|---|---|
| JP | 1994-070728 A | 3/1994 |

(Continued)

OTHER PUBLICATIONS

Peter, C.A., 2000. Use of natural antimicrobials to extend the shelf-life of vacuum-packaged cooked cured meats. (Year: 2000).*

(Continued)

*Primary Examiner* — Leith S Shafi
*Assistant Examiner* — Nicholas R Krasnow
(74) *Attorney, Agent, or Firm* — Revoiution IP, PLLC

(57) ABSTRACT

A method for fabricating an antibacterial container, the method including: reacting allyl chloride with potassium thiocyanate by stirring the allyl chloride and the potassium thiocyanate; mixing a compound resulting from the reaction with a vegetable oil; mixing and melting a PP pellet with the mixture; and injection-molding the melt, wherein the allyl chloride is reacted with the potassium thiocyanate at 150 to 200 RPM for 10 to 36 hours.

5 Claims, 6 Drawing Sheets

(51) Int. Cl.
  *B65D 1/00* (2006.01)
  *C08K 5/00* (2006.01)
  *C08K 5/02* (2006.01)
  *B29B 7/10* (2006.01)
  *B29K 105/00* (2006.01)
  *B29K 23/00* (2006.01)
  *B29L 31/00* (2006.01)

(52) U.S. Cl.
  CPC ............. *B65D 1/00* (2013.01); *C08K 5/0058* (2013.01); *B29B 7/10* (2013.01); *B29K 2023/12* (2013.01); *B29K 2105/0011* (2013.01); *B29L 2031/712* (2013.01); *C08K 5/02* (2013.01)

(56) References Cited

U.S. PATENT DOCUMENTS

| | | | | |
|---|---|---|---|---|
| 2007/0258996 | A1* | 11/2007 | Mookerjee | A01N 31/02 424/195.15 |
| 2008/0020699 | A1* | 1/2008 | Hara | B60H 3/0085 454/156 |
| 2008/0220036 | A1* | 9/2008 | Miltz | A23B 4/20 424/409 |
| 2009/0168590 | A1* | 7/2009 | Koenig | B01F 11/0258 366/114 |
| 2011/0155618 | A1* | 6/2011 | Rubino | B65D 81/24 206/524.1 |
| 2013/0071347 | A1* | 3/2013 | Kang | A01N 47/46 424/76.3 |
| 2013/0104588 | A1* | 5/2013 | Imafuji | F24F 3/16 62/331 |
| 2013/0287918 | A1* | 10/2013 | Fischer | A23L 3/3472 426/532 |
| 2014/0005316 | A1* | 1/2014 | Thetford | C08J 3/203 524/275 |
| 2014/0021202 | A1* | 1/2014 | Hands | B65D 25/20 220/87.1 |
| 2017/0245493 | A1* | 8/2017 | Gezundhait | A01N 25/34 |
| 2018/0223067 | A1* | 8/2018 | Ishizuka | C08L 63/06 |

FOREIGN PATENT DOCUMENTS

| | | |
|---|---|---|
| JP | 1995-238001 A | 9/1995 |
| JP | 1997-151317 A | 6/1997 |
| KR | 10-0676892 B1 | 2/2007 |
| KR | 10-2011-0072469 A | 6/2011 |
| KR | 10-2012-0129778 A | 11/2012 |
| KR | 10-2013-0051798 A | 5/2013 |

OTHER PUBLICATIONS

Lim, L., 2000. Permeation of allyl isothiocyanate, oxygen and water vapor in synthetic and biopolymer films. (Year: 1999).*

Azzouz, M.A., 1982. The Inhibitory Effects of Selected Herbs, Spices, and Other Plant Materials on Mycotoxigenic Molds. (Year: 1982).*

International Search Report for PCT/KR2016/009831 dated Nov. 22, 2016 from Korean Intellectual Property Office.

\* cited by examiner

METHOD FOR FABRICATING ANTIBACTERIAL CONTAINER

TECHNICAL FIELD

The present disclosure relates to a method for fabricating an antibacterial container having an antibacterial function, and more particularly, to a method for fabricating an antibacterial container of an allyl compound, a thiocyanate compound, and a vegetable oil.

BACKGROUND ART

Antibacterial storage containers for keeping food have been developed and are available in the market. In general, an antibacterial container is fabricated by mixing antibacterial inorganic particles such as silver nanoparticles with a container material and subjecting the mixture to injection molding. Inorganic particles offer the benefits of easy handling, low price, and thus low fabrication cost. However, these inorganic particles rely on the property that they have an antibacterial activity when they are contacted. Rather than the inorganic particles prevent bacteria from damaging food in the storage container, they just have the effect of preventing proliferation of bacteria in the storage container, which are smeared when the storage container is handled.

Meanwhile, techniques of fabricating food storage containers with the antibacterial function of organic components have been developed and commercialized. Such a food storage container is fabricated by mixing an antibacterial organic material with polyethylene or polypropylene resin and subjecting the mixture to injection molding. Compared to inorganic particles such as silver nanoparticles, there is a relatively large need for considering a fabrication parameter such as a processing temperature for an organic material. Moreover, even though an antibacterial organic material has excellent antibacterial performance, lots of cost is taken to obtain or synthesize the antibacterial organic material, thus making the antibacterial organic material cost-ineffective.

DISCLOSURE

Technical Problem

An aspect of the present disclosure is to provide a method for fabricating an antibacterial container, and particularly, a method for fabricating an antibacterial container with a high antibacterial activity by increasing the thermal stability of a compound resulting from reaction between an allyl compound and a thiocyanate compound by using a vegetable oil.

Technical Solution

According to an embodiment of the present disclosure, a method for fabricating an antibacterial container includes reacting allyl chloride with potassium thiocyanate by stirring the allyl chloride and the potassium thiocyanate; mixing a compound resulting from the reaction with a vegetable oil; mixing and melting a PP pellet with the mixture; and injection-molding the melt.

Meanwhile, the allyl chloride may react with the potassium thiocyanate at 150 to 200 RPM for 10 to 36 hours.

Meanwhile, the compound and the vegetable oil may be mixed at 1:10 to 1:30.

Meanwhile, the mixture may be 0.5 to 2.5 weight % with respect to the weight of the PP pellet.

Meanwhile, the method may further include stirring the PP pellet and the mixture at 100 to 130° C. for two hours.

Meanwhile, the injection molding may be performed at 200 to 230° C.

Meanwhile, the vegetable oil may include at least one of soybean oil, corn oil, rapeseed oil, and grape seed oil.

Meanwhile, the compound and the vegetable oil may be mixed by ultrasonic processing.

Advantageous Effects

In the method for fabricating an antibacterial container according to the embodiment of the present disclosure, an allyl compound is reacted with a thiocyanate compound at a high temperature, for container molding. Therefore, a method for fabricating an antibacterial container, which has the effect of generating a high-concentration antibacterial material, can be provided.

MODE FOR CARRYING OUT THE INVENTION

The objects and effects of the present disclosure, and technical configurations for achieving them will be apparent from embodiments described below in conjunction with the attached drawings. In describing the present disclosure, a detailed description of a known function or structure will be avoided lest it should obscure the subject matter of the present disclosure. The later-described terms are defined in consideration of structures, roles, and functions in the present disclosure, and may be changed according to the intention of a user or an operator, or customs.

However, the present disclosure may be implemented in various manners, not limited to the following embodiments. Rather, the embodiments are provided to make the present disclosure comprehensive and help those skilled in the art to comprehensively understand the scope of the present disclosure, and the present disclosure is defined only by the appended claims. Therefore, the definition should be made based on what lies throughout the specification.

Throughout the specification, when it is said that some part "includes" or "is provided with" a component, this means that any other component may further be included, not excluding other components, unless otherwise mentioned.

Now, a detailed description will be given of an embodiment of the present disclosure.

The embodiment of the present disclosure provides a method for fabricating an antibacterial container with a high antibacterial activity by increasing the thermal stability of a compound resulting from reaction between an allyl compound and a thiocyanate compound by using a vegetable oil.

Figure 1:
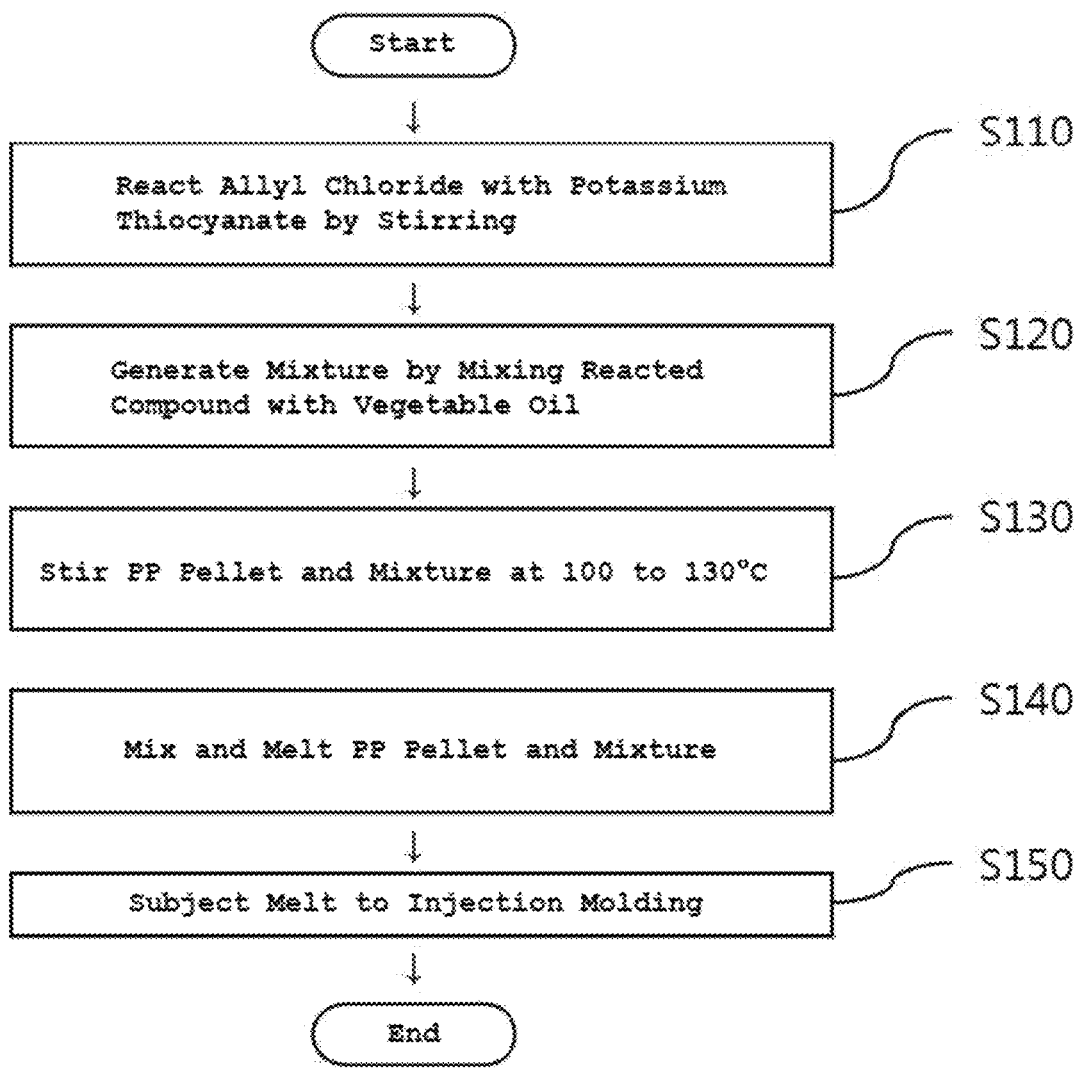
FIG. 1 is a flowchart illustrating a method for fabricating an antibacterial container according to the present disclosure.
Figure 2:
FIG. 2 is a view illustrating a test starting phase.
Figure 3:
FIG. 3 is a view illustrating the states of cherry tomatoes after 5 days from the start of a test.
Figure 4:
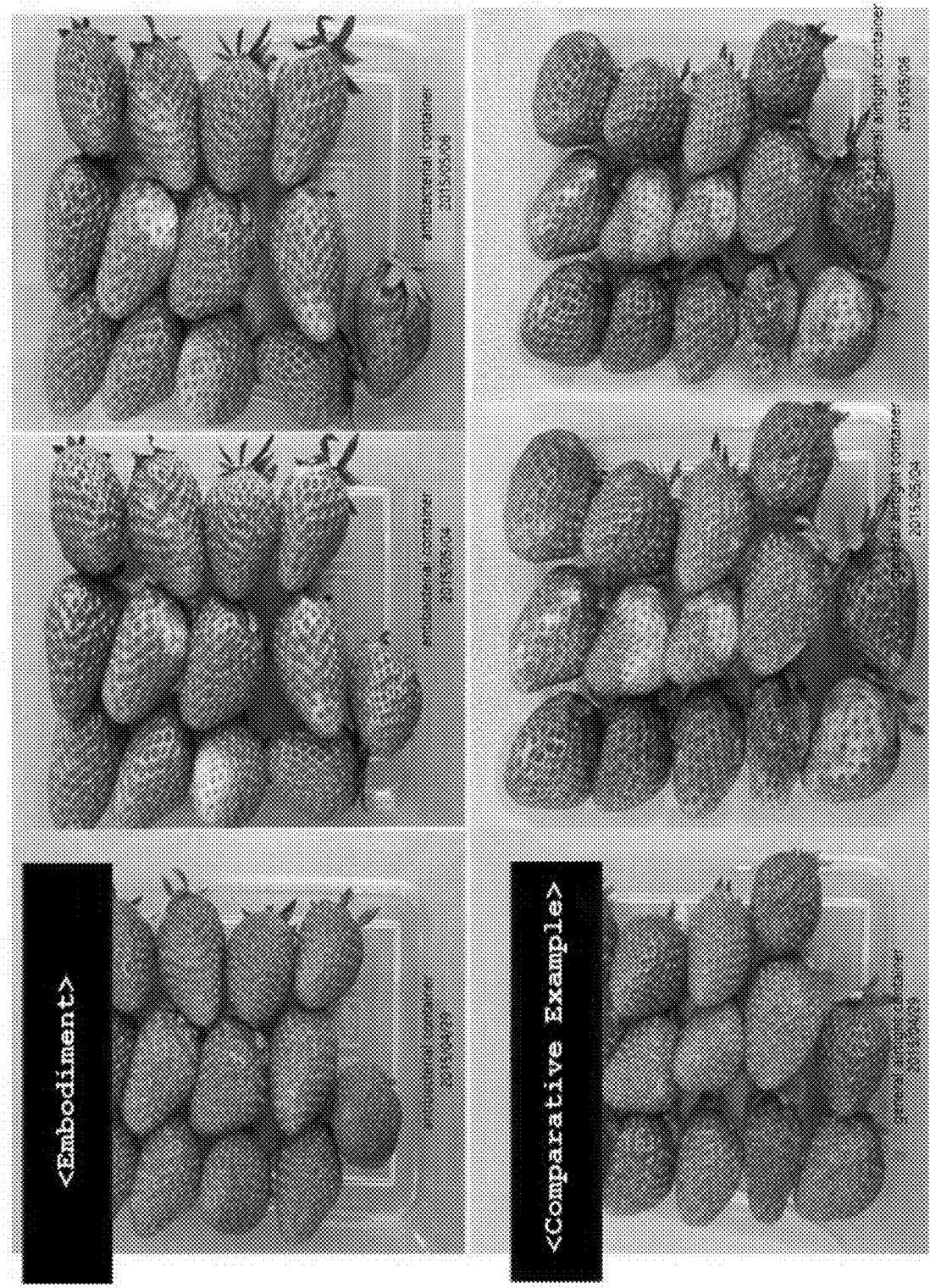
FIG. 4 is a view illustrating the states of strawberries after 5 days and 7 days from the start of the test.
Figure 5:
FIG. 5 is a view illustrating the states of bread after 26 days from the start of the test.
Figure 6:
FIG. 6 is a view illustrating the states of milk after 7 days from the start of the test.

FIG. 1 is a flowchart illustrating a method for fabricating an antibacterial container according to the present disclosure. Referring to FIG. 1, a method for fabricating an antibacterial container according to an embodiment of the present disclosure includes stirring allyl chloride and potassium thiocyanate, thus causing reaction between the allyl chloride and the potassium thiocyanate (S110). The allyl chloride and the potassium thiocyanate may react at 150 to 200 RPM for 10 to 36 hours. The reaction between the allyl chloride and the potassium thiocyanate results in production of a material having a strong mustard flavor. The reactant contains a liquid called allyl isothiocyanate showing a transparent yellow state of liquid. However, since the throughput of the allyl isothiocyanate from the reaction is not high, the allyl chloride and the potassium thiocyanate co-exist in the reactant. A reaction may take place between the allyl chloride and the potassium thiocyanate which have not participated in the reaction by a later-described additional process, thus producing allyl isothiocyanate. Allyl iodide or allyl bromide may be used together with or instead of allyl chloride, and sodium thiocyanate (NaSCN) may be selected and used together with or instead of potassium thiocyanate.

Subsequently, the reacted compound is mixed with a vegetable oil (S120). The vegetable oil is mixed with the reactant, thus producing a mixture. Preferably, the vegetable oil increases the boiling point of the mixture. The vegetable oil functions to dilute the reacted compound and serves as a medium that helps the allyl isothiocyanate to spread an antibacterial scent in the whole antibacterial container. Without the vegetable oil, the compound may exist only in a specific part of the antibacterial container. Thus, the vegetable oil may function to coat the antibacterial compound uniformly on polypropylene (PP) resin. The vegetable oil may be any of soybean oil, corn oil, canola oil (rapeseed oil), grape seed oil, and so on. Since the vegetable oil has a high boiling point and a high smoke point, the vegetable oil may reduce the amount of the compound which is vaporized or decomposed at a high temperature. The vegetable oil and the compound may be mixed by stirring. More preferably, the mixing may be performed by ultrasonic processing. Preferably, the ultrasonic processing-based mixing increases the uniformity of the composition. The mixing ratio between the vegetable oil and the reacted compound is preferably 1:10 to 1:20 in weight. If the mixing ratio is less than 1:10, it may be difficult to spread the reacted compound uniformly. On the other hand, if the mixing ratio is greater than 1:20, the content of the vegetable is excessive, and thus the antibacterial effect almost disappears.

Then, the method may further include stirring a PP pellet and the mixture of the vegetable oil and the reacted compound at 100 to 130° C. for two hours (S130). If the mixture is stirred at 100 to 130° C. for two hours, the throughput of the allyl isothiocyanate may be increased, compared to the reaction between the allyl chloride and the potassium isothiocyanate at room temperature. The reaction between the allyl chloride and the potassium thiocyanate takes place by about 90% or above by performing this step before the melting temperature of the PP pellet is reached. Therefore, the antibacterial container with potassium isothiocyanate may be fabricated more economically by directly adding a raw material prior to the synthesis of the potassium isothiocyanate in the process of fabricating the antibacterial container than by separately producing the potassium isothiocyanate and adding the potassium isothiocyanate. Further, as this step is performed, the change of the reactant caused by a rapid temperature change may be prevented.

That is, the method for fabricating an antibacterial container according to the embodiment of the present disclosure may generate high-concentration allyl isothiocyanate with a low-price raw material by including the steps S120 and S130, and the synthesis of the allyl isothiocyanate is included in the method for fabricating an antibacterial container. Due to the resulting utilization of heat energy involved in injection molding, the method for fabricating an antibacterial container according to the embodiment of the present disclosure is advantageous in resource saving and resource utilization, compared to the conventional technique of separately fabricating a raw material and adding the raw material in fabrication of an antibacterial container.

Subsequently, a PP pellet and the mixture are mixed and melt (S140). The mixture includes the compound of the allyl chloride and the potassium thiocyanate. Preferably, 0.4 to 2.5 weight % of the mixture with respect to the weight of the PP pellet is included. If the content of the mixture is equal to or less than 0.5 weight %, the antibacterial activity may not appear. On the other hand, if the content of the mixture is larger than 2.5 weight %, the mustard flavor from the compound may affect the flavor of food in the antibacterial container. Moreover, the mechanical property of the antibacterial container may rapidly be degraded. Then, the antibacterial container may be produced by subjecting the melt to injection molding (S150). The injection molding may be performed at 200 to 230° C. The PP resin may not be melt sufficiently at a temperature below 200° C., whereas a temperature higher than 230° C. is higher than the smoke point of the vegetable oil, thereby rapidly degrading the antibacterial activity in view of the resulting vaporization or extinction of the antibacterial material containing the allyl isothiocyanate as well as the vegetable oil. In addition, the formability and quality of the antibacterial container may become poor due to smoke of the vegetable oil.

Embodiment

The present disclosure will further be described through an embodiment. The embodiment is a mere example of the present disclosure, and thus it is apparent to those skilled in the art that the scope of the present disclosure is not limited by the embodiment.

First, allyl chloride and potassium thiocyanate are added in a flask, stirred at 180 RPM, and held for 24 hours, for reaction. The reacted compound is mixed with soybean oil having a smoke point of about 240° C. at a weight ratio of 1:10 by ultrasonic processing, the mixture is added by about 1.2 weight % with respect to the weight of a PP pellet, and the mixture and the PP pellet are further stirred at about 105° C. for two hours. About 1.0 to 1.1 weight % of the mixture containing the reacted compound of the allyl chloride and the potassium thiocyanate with respect to the weight of the PP pellet is included by the additional stirring. The results of an antibacterial test of samples fabricated according to the fabrication method are illustrated in [Table 1] below.

Antibacterial activity (JIS Z 2801: 2010, film contact method): the number of bacteria/CM$^2$, the value of an antibacterial activity: log

TABLE 1

|  |  | Embodiment | Comparative example |
|---|---|---|---|
| Strain 1 | Initial number of bacteria | $1.3 \times 10^4$ | $1.3 \times 10^4$ |

TABLE 1-continued

|  |  | Embodiment | Comparative example |
|---|---|---|---|
|  | After 24 hrs | $9.4 \times 10$ | $1.9 \times 10^4$ |
|  | Value of antibacterial activity | 2.3 | — |
| Strain 2 | Initial number of bacteria | $1.3 \times 10^4$ | $1.3 \times 10^4$ |
|  | After 24 hrs | $1.6 \times 10^2$ | $9.4 \times 10^5$ |
|  | Value of antibacterial activity | 3.8 | — |
| Strain 3 | Initial number of bacteria | $1.3 \times 10^4$ | $1.3 \times 10^4$ |
|  | After 24 hrs | $1.5 \times 10$ | $3.1 \times 10^5$ |
|  | Value of antibacterial activity | 4.3 | — |
| Strain 4 | Initial number of bacteria | $1.3 \times 10^4$ | $1.3 \times 10^4$ |
|  | After 24 hrs | <0.63 | $3.8 \times 10^5$ |
|  | Value of antibacterial activity | 5.8 | — |

* Comparative example: standard film (Stomacher 400 POLY-BAG)
* Test condition: a test bacteria liquid is grown statically at (35 ± 1)° C. and an RH of 90% for 24 hours, and then the number of bacteria is counted.
* Antibacterial effect: the value of an antibacterial activity equal to or greater than 2.0 log or more
* Used known strains:
Strain 1-*Staphylococcus aureus* ATCC 6538P.
Strain 2-*Escherichia coli* ATCC 8739.
Strain 3-*Klebsiella pneumoniae* ATCC 4352.
Strain 4-*Pseudomanas aeruginosa* ATCC 27853.

Meanwhile, FIGS. 2 to 6 illustrate antibacterial effects observed at room temperature in an antibacterial container fabricated according to the embodiment of the present disclosure, and a general airtight container. As illustrated in FIGS. 2 to 6, it was observed that food had seldom been decomposed or rotten in the antibacterial container fabricated according to the embodiment of the present disclosure. It can be seen from FIGS. 2 to 6 that since the component of allyl isothiocyanate spreads in the form of gas and thus has an antibacterial activity, thereby enabling hygienic food storage in the antibacterial container fabricated according to the embodiment of the present disclosure.

While a preferred embodiment of the present disclosure has been disclosed in the specification and the drawings and specific terms are used, they are used in their general meaning to facilitate easy description of the present disclosure and help the understanding of the present disclosure, not limiting the scope of the present disclosure, Thus, it will be apparent to those skilled in the art that aside from the embodiment disclosed herein, other modifications can be made based on the technical idea of the present disclosure.

The invention claimed is:

1. A method for fabricating an antibacterial container, the method comprising:
    reacting allyl chloride with potassium thiocyanate by stirring the allyl chloride and the potassium thiocyanate,
    wherein the allyl chloride is reacted with the potassium thiocyanate at 150 to 200 RPM for 10 to 36 hours;
    mixing a compound resulting from the reaction with a vegetable oil;
    stirring a PP pellet and a mixture of the compound and the vegetable oil at 100 to 130° C. for two hours;
    mixing and melting the PP pellet with the mixture; and
    injection-molding the PP pellet with the mixture.

2. The method according to claim 1, wherein the compound and the vegetable oil are mixed at 1:10 to 1:20.

3. The method according to claim 1, wherein the mixture is 0.5 to 2.5 weight % with respect to the weight of the PP pellet.

4. The method according to claim 1, wherein the injection molding is performed at 200 to 230° C.

5. The method according to claim 1, wherein the vegetable oil includes at least one of soybean oil, corn oil, rapeseed oil, and grape seed oil.

* * * * *